United States Patent
Pognant

(10) Patent No.: US 11,764,988 B2
(45) Date of Patent: Sep. 19, 2023

(54) METHOD FOR CONFIGURING A HOME AUTOMATION DEVICE BELONGING TO A HOME AUTOMATION INSTALLATION

(71) Applicant: OVERKIZ, Metz-Tessi (FR)

(72) Inventor: Sylvain Pognant, Seynod (FR)

(73) Assignee: OVERKIZ, Metz-Tessi (FR)

( * ) Notice: Subject to any disclaimer, the term of this patent is extended or adjusted under 35 U.S.C. 154(b) by 293 days.

(21) Appl. No.: 16/621,596

(22) PCT Filed: Jun. 7, 2018

(86) PCT No.: PCT/FR2018/051319
§ 371 (c)(1),
(2) Date: Dec. 11, 2019

(87) PCT Pub. No.: WO2018/229396
PCT Pub. Date: Dec. 20, 2018

(65) Prior Publication Data
US 2021/0297279 A1    Sep. 23, 2021

(30) Foreign Application Priority Data
Jun. 14, 2017   (FR) ..................................... 17/55376

(51) Int. Cl.
*H04L 41/0813*   (2022.01)
*H04L 12/28*   (2006.01)
(Continued)

(52) U.S. Cl.
CPC ...... *H04L 12/2807* (2013.01); *H04L 41/0813* (2013.01); *H04L 41/0846* (2013.01); *H04L 67/125* (2013.01)

(58) Field of Classification Search
CPC ............ H04L 12/2807; H04L 41/0813; H04L 41/0846; H04L 67/125
(Continued)

(56) References Cited

U.S. PATENT DOCUMENTS

2010/0257584 A1* 10/2010 Meenan .............. H04L 41/0846
726/1
2016/0050116 A1   2/2016 Sheshadri et al.
(Continued)

OTHER PUBLICATIONS

International Search Report for Application No. PCT/FR2018/051319.
Written Opinion for Application No. PCT/FR2018/051319.

*Primary Examiner* — Sibte H Bukhari
(74) *Attorney, Agent, or Firm* — CANTOR COLBURN LLP

(57) ABSTRACT

The present invention relates to a method for configuring a second home automation device (D2) by means of replacing a first home automation device (D1), the method comprising the following steps: recording (ERU1) at least one set of configuration data or instructions (cfg1) associated with a unique identifier of a first home automation device (D1); receiving (ERU9) a configuration request from a second home automation device (D2); determining (ERU10) an association between the second home automation device (D2) on the one hand and the first home automation device (D1) on the other hand; determining (ERU11) at least one set of configuration data or instructions (cfg2) associated with the second home automation device (D2); sending (ERU12) at least one configuration message (MCfg) comprising the at least one set of configuration data or instructions (cfg2) to the second home automation device (D2).

9 Claims, 4 Drawing Sheets

(51) Int. Cl.
 *H04L 41/084* (2022.01)
 *H04L 67/125* (2022.01)
(58) Field of Classification Search
 USPC .......................................................... 709/220
 See application file for complete search history.

(56) References Cited

U.S. PATENT DOCUMENTS

2017/0054615 A1    2/2017  Wilson et al.
2017/0111247 A1*   4/2017  Uchiyama ............. G06F 3/1229
2017/0371309 A1*  12/2017  Meruva .............. G05B 19/0426

* cited by examiner

METHOD FOR CONFIGURING A HOME AUTOMATION DEVICE BELONGING TO A HOME AUTOMATION INSTALLATION

CROSS REFERENCE TO RELATED APPLICATIONS

This application is a National Stage of PCT Application No. PCT/FR2018/051319 filed on Jun. 7, 2018, which claims priority to French Patent Application No. 17/55376 filed on Jun. 14, 2017, the contents each of which are incorporated herein by reference thereto.

FIELD OF THE INVENTION

The present invention concerns a method for configuring at least one central control unit or a home automation device belonging to a home automation installation.

PRIOR ART

A home automation installation of a building may comprise one or several home automation device(s). It is known to proceed with the monitoring, that is to say the control and/or the supervision of said installation using a central control unit which communicates with one or several home automation device(s). Such a central control unit may be integrated to a home automation device or be independent.

A home automation device has to be configured to enable its interaction with a central control unit, or with at least another home automation device of the home automation installation or a remote functional service, such as for example a user service.

Several different configurations may be considered for the same device, which implies implementing a configuration method adapted in particular according to the central control unit or the devices or services to be connected, or proceeding with a configuration in situ during the set-up of the device in the home automation installation, this configuration may turn out to be complex.

When a device has to be replaced because of a failure or to install a new model, this device has to be configured again to adapt it to the installation and to enable its operation.

The present invention aims at solving all or part of the above-mentioned drawbacks.

DISCLOSURE OF THE INVENTION

To this end, the present invention concerns:

A method for configuring a second home automation device belonging to a home automation installation, in the context of a replacement of a first home automation device, the method being implemented by a central control unit of the home automation installation or by a remote management unit and comprising the following steps:
  Registration of at least one set of configuration data or instructions associated to a unique identifier of a first home automation device;
  Reception of a configuration request linked to an identifier of a second home automation device;
  Determination of an association between the second home automation device or its identifier on the one hand and the first home automation device or its identifier on the other hand;
  Determination of at least one set of configuration data or instructions associated to the identifier of the second home automation device from the at least one set of configuration data or instructions associated to the unique identifier of the first home automation device;
  Sending at least one configuration message comprising the at least one set of configuration data or instructions associated to the identifier of the second home automation device to the second home automation device.

Thanks to the arrangements according to the invention, a replacement home automation device may be configured by taking on the configuration of the previous home automation device. This replacement may intervene in case of failure, or in case of replacement with a new model of home automation device. The replacement home automation device may be configured in a minimal or generic way in factory and during its distribution. During the initial operation of this home automation device, the adequate configuration, corresponding to a configuration derived from the configuration of the first home automation device is obtained from the service of a central control unit or from a configuration service executed by a remote management unit. For example, these arrangements allow configuring the communication with at least one home automation device present in the home automation installation, the communication with a particular user service for control and/or supervision. They also allow proceeding with a geographical adaptation of the communication frequency bands, to communicate in authorized frequency bands depending on the geographical area. It is also possible to proceed with a configuration of the functional offering of the home automation device, or with the configuration of the human-machine interface. The configuration may also comprise a download of a software component or of a software component portion to be executed on the home automation device.

Thus, the configuration of the replacement home automation device is greatly simplified.

In the context of the present invention, a home automation device is a home automation equipment and/or a sensor, or else a portion of a home automation equipment or a portion of a sensor corresponding to a functional subset. A home automation device may also correspond to a control point of other home automation devices.

In the context of the present invention, an installation is a set comprising a plurality of home automation devices and at least one central control unit arranged within one single building or on a plurality of locations, each home automation device being connected to an electronic control unit among the plurality of electronic control units, the plurality of electronic control units forming a group under the control of a user. The electronic devices form groups of at least one home automation device attached to an electronic control unit.

In the context of the present invention, a central control unit of the home automation installation is an electronic unit comprising:
  at least one processing unit to contain and execute at least one computer program,
  at least one communication module intended for the monitoring and/or control of at least one home automation device; and
  at least one module for communication with the management unit.

The electronic unit may be independent from or integrated into a home automation device. In this last case, the communication module intended for the monitoring and/or control of the device may be a communication module internal to the home automation device and/or a communication module intended for the monitoring and/or control of other home automation devices. In some applications, a central control unit may communicate with the management unit through an intermediate management unit, for example a third-party service provider, whose intermediate management unit provides a service interface or API (standing for "Application Program Interface").

The central control unit may also be integrated to a router and/or a modem achieving a connection to a wide area network, in particular the Internet.

In the context of the present invention, a configuration service is intended to identify the correct technical configuration for the home automation device or the considered central control unit and to communicate configuration information to the central control unit. This service may correspond to a remote access service or to a user service intended for the monitoring and/or control and/or supervision of the home automation installation by a user or by an application. This service may be a remotely-accessible computerized service. This service may enable access to at last one control or supervision function of a home automation installation or of a home automation device, by means of a user interface or an application. The user interface may be accessible by a graphical interface, or through a programming interface.

By user, it should be understood an end user, an installer or a maintenance operator.

According to an aspect of the invention, the management unit executing the remote service is a server remotely connected to the at least one home automation installation via a wide area network. It should be noted that the term server is a logical designation which may cover the use of several physical servers to distribute the computer processing load to be carried out.

According to another aspect of the invention, the management unit(s) executing the first configuration service may be a central unit intended to be connected to one or several central control unit(s) on distinct private or local area networks, or else on the same local area network.

In general, the supervision corresponds to a supervision based on the processing of values of the state variables of at least one home automation device or one central control unit.

In the context of the present invention, a state variable is an element describing the state of a home automation device. The value of a state variable may correspond to the ON/OFF condition for a switch, or to an opening degree or percentage for a shutter. Moreover, a state variable may correspond to a measurement value of a sensor, for example a value of a physical or environmental quantity. The description of the states of the devices may be generic or specific, depending on the local protocol. The identifiers of the state variables may be numeric or alphanumeric. The values of the state variables may use formats or scales which are customized or proprietary.

In the context of the present invention, a command corresponds to an order that may be given to a home automation device or to a central control unit in order to carry out an action by a device or to obtain an information feedback, for example an information relating to a state variable of this device.

In the context of the present invention, a message is an information element notified or received via a communication module from an external equipment, or in the form of a synchronous or asynchronous call, which may also correspond to a local or remote function call.

According to one implementation, the method comprises a prior step of plugging or initializing the home automation device.

This plugging/initialization may be trigged by an electric power supply or by an order originating from an instruction of the user through a physical action on the home automation device such as a press on a button or a sending of instruction via a terminal.

According to an aspect of the invention, the sending of the configuration request may correspond to an attempt to connect to the central control unit. This connection attempt identifies the home automation device by an identifier.

According to an aspect of the invention, in an initial or prior phase of the replacement method, the home automation device communicates its configuration in the form of at least one set of configuration data and/or instructions to the central control unit or to the configuration service.

These steps may be carried out at will during a backup operation carried out at the end of the configuration of the home automation device, and/or periodically with updates of the stored data. It is also possible that these steps are possibly initiated before a replacement in the case of installation of a new model of home automation device.

In general, the configuration request step intervenes after a failure or a disabling of the first home automation device. The disabling may correspond to an expected installation of a new model of home automation device.

The step of determining at least one set of configuration data or instruction associated to the identifier of the second home automation device from the at least one set of configuration data or instruction associated to the unique identifier of the first home automation device may be carried out subsequently or partially or totally prior to the step of receiving a configuration request.

According to an aspect of the invention, the step of determining an association between the second home automation device or its identifier on the one hand and the first home automation device or its identifier on the other hand comprises a step of checking up in a configuration repository in order to determine whether the identifier of the second home automation device is assigned.

The recognition of the assignment of the identifier of the second home automation device may be a requisite for the determination of at least one set of configuration data or instructions associated to the identifier of the second home automation device. Otherwise, this means that the configuration request cannot be addressed because the replacement request has not been registered. Hence, a valid replacement should be determined before resuming the configuration.

According to an aspect of the invention, the configuration request originates from the second home automation device.

According to another aspect of the invention, the configuration request may originate from a user, acting on the central control unit, directly using a user interface or through a mobile terminal, or through the configuration service.

According to an aspect of the invention, the at least one set of configuration data or instructions associated to the identifier of the second home automation device comprises at least one datum or instruction for configuring at least one emission and/or reception address of the second home automation device used for a communication interface with a third home automation device of the home automation installation or the central control unit.

Thanks to these arrangements, the configuration of at least one emission address enables a direct communication in emission with a home automation device or the central control unit whose address was known to the previous home automation device and which is taken on by the new home automation device.

A home automation device that is related to the central control unit, such as for example a lamp, and communicating with the central control unit may store an address corresponding to the ancient central control unit for example in order to be able to send notifications to said central control unit.

Thanks to the configuration of the reception address of the new home automation device which takes on the reception address of the previous home automation device, a direct communication is enabled between the device and the central control unit or other home automation devices because the value of the address of the ancient home automation device is assigned to the new home automation device.

According to an aspect of the invention, the communication interface is related to communication according to at least one communication protocol.

According to an aspect of the invention, the configuration step may comprise several steps of configuring several addresses corresponding for example to a plurality of communication interfaces using a plurality of distinct communication protocols.

According to an aspect of the invention, the address value(s) are part of the at least one set of configuration data or instructions originating from the first configuration remote service.

According to an aspect of the invention, the at least one set of configuration data or instructions associated to the identifier of the second home automation device comprises at least one datum or instruction for configuring an emission and/or reception address used by a communication interface of a third home automation device related to the central control unit of the home automation installation, the method further comprising the following step:

Sending at least one configuration message comprising the at least one configuration datum or instruction of an emission and/or reception address used by a communication interface of a third home automation device to the third home automation device.

Thanks to these arrangements, the configuration of at least one emission address in the third device enables the home automation device to communicate in emission with the new home automation device, in particular when the address cannot be kept for the new second device.

A third home automation device that is related to the central control unit, such as for example a switch, and communicating with the first home automation device corresponding for example to a lamp, may store an address corresponding to said lam for example in order to be able to send notifications to said central control unit.

Similarly, it is possible to modify a reception address for example to authorize the second home automation device to send commands to the third home automation device.

According to an aspect of the invention, the method further comprises the following steps:
Reception of a replacement request in connection with an identifier of the first home automation device and an identifier of the second home automation device;
Registration in a configuration repository of an association between the first home automation device or its identifier on the one hand and the second home automation device or its identifier on the other hand.

According to an aspect of the invention, the replacement request originates from a user, for example through a user terminal.

In the case of the replacement with a new model of central control unit, the replacement request may intervene before the disabling.

According to an aspect of the invention, the unique identifier of a home automation device may comprise for example a MAC address or a serial number. This identifier may be in the form of a QR (or QR-Code, standing for "Quick Response Code") code or another barcode optically readable on the device or the packaging thereof, or in the form of a radio frequency identification tag (or RFID, standing for "Radio Frequency IDentification"), a near field communication tag (or NFC, standing for "Near Field Communication") or any other tag readable by a device available to the user, such as for example a mobile communication terminal.

According to an aspect of the invention, the step of determining at least one set of configuration data or instructions associated to the identifier of the second home automation device from the at least one set of configuration data or instructions associated to the unique identifier of the first home automation device comprises an at least partial copy of the at least one set of configuration data or instructions associated to the identifier of the first home automation device.

According to an aspect of the invention, the step of determining at least one set of configuration data or instructions associated to the identifier of the second home automation device from the at least one set of configuration data or instructions associated to the unique identifier of the first home automation device comprises a modification of a format of the configuration data or instructions or a modification of a structure of the configuration data or instructions.

Thanks to these arrangements, it is in particular possible to replace a first central control unit with a second central control unit of a type different than the first home automation device, for example in the case of an upgrade or of the use of a different hardware system.

As example, a change in the structure of the calendar information representation model may be taken into account: according to a first model, an event is represented with a weekly recurrence. According to a second model, an event may be represented with a recurrence expressed according to complementary parameters, such as a day of the month or the number of the week in the month. The more sophisticated second model may express the event expressed according to the first model, after a structure modification. Functionally, the result is the same.

The new functions offered by the second model may be configured by default.

According to an aspect of the invention, the step of determining at least one set of configuration data or instructions associated to the identifier of the second home automation device from the at least one set of configuration data or instructions associated to the unique identifier of the first home automation device comprises an adaptation of the configuration data or instructions.

According to an aspect of the invention, the adaptation of the at least one set of configuration data or instructions concerns an emission or reception address or a unique identifier which should be replaced in the at least one set of configuration data or instructions.

According to an aspect of the invention, the step of determining at least one set of configuration data or instructions associated to the identifier of the second home automation device from the at least one set of configuration data or instructions associated to the unique identifier of the first home automation device may be carried out prior to the configuration request step, after the replacement request. Alternatively, said determination step may be carried out subsequently to the replacement request.

According to an aspect of the invention, the method further comprises the following step:

Registration of the at least one set of configuration data or instructions associated to the identifier of the second home automation device in the configuration repository.

According to an aspect of the invention, the method further comprises the following step:

Update of the configuration repository so as to register the effective replacement of the first home automation device with the second central control unit.

According to an aspect of the invention, the method comprises a step consisting in suppressing or invalidating the record corresponding to the ancient home automation device in the configuration repository.

According to an aspect of the invention, the update comprises the steps of updating the elements that referred to the first home automation device to replace said reference with a reference to the second home automation device.

In particular, the update may comprise an update of a repository of installations; and/or an update of a repository of home automation devices and/or an update of a repository of scenarios.

According to an aspect of the invention, the method further comprises the following steps:

Check-up of the availability of the unique identifier of the second home automation device before the configuration repository;

The check-up step being prior to the registration of the replacement request.

The recognition of the availability of the identifier may be a requisite for the registration of the replacement request. If the availability of the unique identifier before the configuration repository is not recognized, this means that the subscription request cannot be addressed because the second home automation device is already associated to a configuration and/or to an installation. Hence, a conflict concerning this identifier should be solved.

According to an aspect of the invention, the method further comprises a step of checking up the existence and the rights of the user corresponding to the identifier before a user repository.

The recognition of the validity of the user account is a requisite for the configuration or the replacement of the home automation device. Otherwise, this means that the subscription request cannot be addressed because the associated user account on the service is not valid or does not exist. Hence, a valid user account on this service should be determined before resuming the replacement.

The different non-incompatible aspects defined hereinabove may be combined.

BRIEF DESCRIPTION OF THE FIGURES

The invention will be better understood from the detailed description which is exposed hereinafter with reference to the appended drawing in which.

DESCRIPTION WITH REFERENCE TO THE FIGURES

In the following detailed description of the figures defined hereinabove, the same elements or the elements filling identical functions may preserve the same references so as to simplify the understanding of the invention.

Description of a System Comprising a Home Automation Installation

Figure 1:
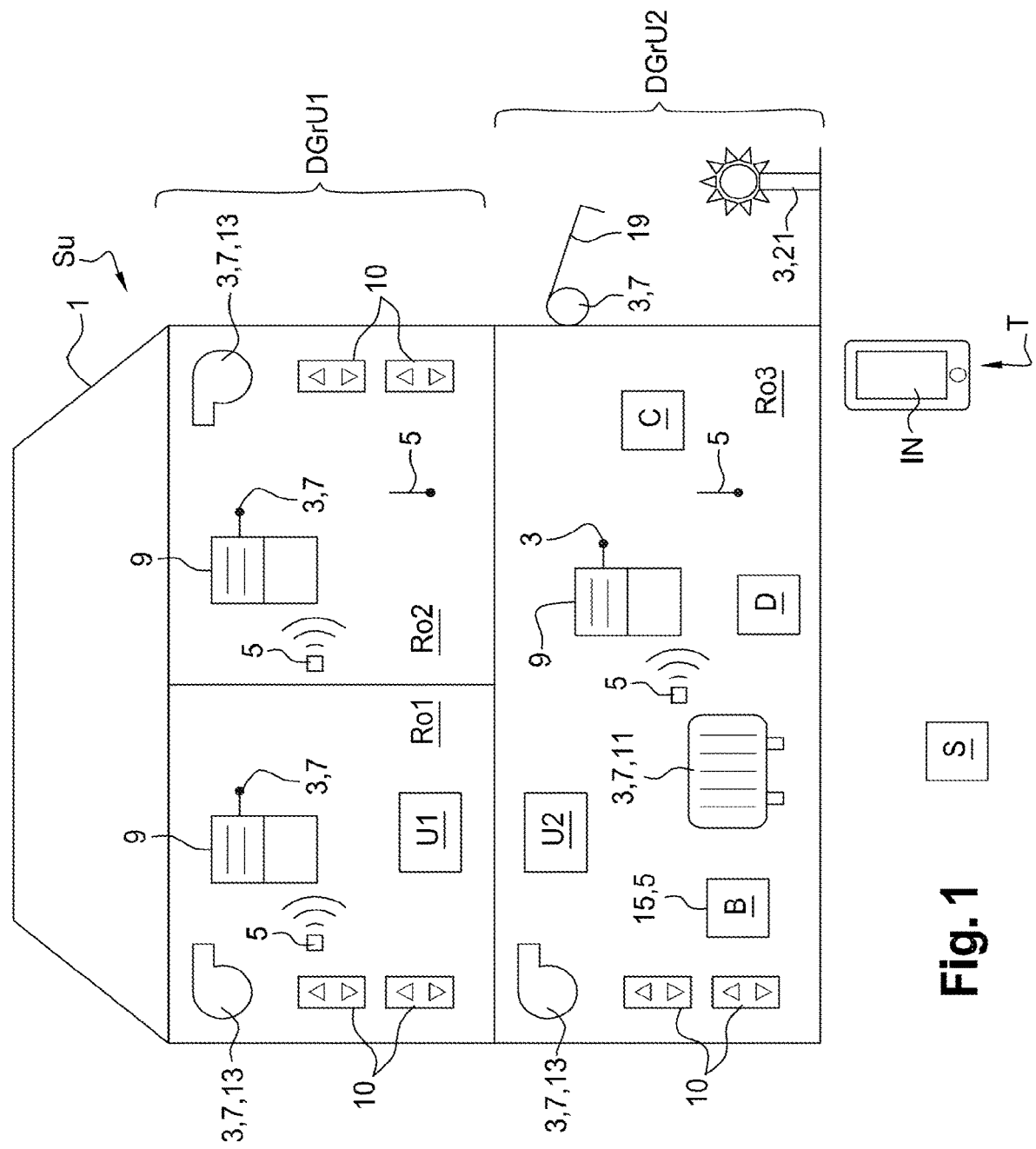
FIG. 1 is a schematic view of a building and of a home automation installation in accordance with an embodiment of the invention.

As illustrated in FIG. 1, a building 1 comprises for example three rooms Ro1, Ro2, Ro3. The building 4 also comprises home automation equipment 3 and sensors 5.

A home automation equipment 3 may consist of an actuator arranged to displace or set an element of the building 1, for example an actuator 7 for displacing a rolling shutter 9 or a terrace awning 19, or a regulation system 10 for a heater 11 or a ventilation system 13. A home automation equipment 3 may also consist of a lighting, for example a terrace external lighting 21 or a lighting control system, an alarm system, or still a video camera, in particular a video-surveillance camera.

The home automation installation Su may also comprise a control point 15 an actuator 7, such as a wireless control box B for the rolling shutter 9.

The home automation installation Su may comprise one or several sensor(s) 5, integrated to an actuator 7, to a control point 15 or to the control box B or independently of these elements. In particular, a sensor 5 may be arranged to measure a physical unit, for example a temperature sensor, an insolation sensor or a humidity sensor. Position sensors 5 of home automation equipment 3 of the building 1, such as, for example, sensors of the open state of a rolling shutter 9 or sensors of the position of a door leaf such as a window, whether motorized or not, may also be provided. The home automation installation may also comprise one or several presence sensor(s). The installation may also comprise one or several electric consumption sensor(s).

A home automation equipment 3 and a sensor 5 should thus be considered as units having information on observed actual states of elements of the building 1 and being capable of sharing this information with other elements of the home automation installation Su.

The home automation equipment 3 and the sensors 5 can thus have access to any measurable physical unit, such as the temperature of each room Ro1, Ro2, Ro3 or a state of an element of the building 1, such as the open state of a rolling shutter 9, the state of an alarm, etc.

In the following, we will use the home automation device or device D designation indifferently to designate sensors or home automation equipment, or parts of home automation equipment 3 or sensors 5.

In general, the home automation devices comprise a processing unit comprising a processor executing an embedded software. This software undergoes updates to improve the functions thereof or to proceed with corrections.

The home automation installation Su comprises a central control unit or a plurality of central control units U1, U2. In particular and as example, two central control units U1, U2 are represented in FIG. 1. According to one variant, a home automation installation may also comprise one single central control unit.

Each central control unit U1, U2 is arranged to control and/or monitor part of the devices D of the installation Su forming a group DGrU1, DGrU2. As example, in FIG. 1, the central control unit U1 is in charge of the devices D disposed in the rooms Ro1 and Ro2 of the first floor of the building, whereas the central control unit U2 is in charge of the devices D disposed in the room Ro3 on the ground floor of the building and the external devices.

In particular, the control and/or monitoring is carried out remotely, in particular using a wireless communication protocol, for example a radio communication protocol. Each central control unit U1, U2 is arranged to group together all data originating from the devices D of its group DGrU1, DGuU2 and to process these data.

Figure 2:
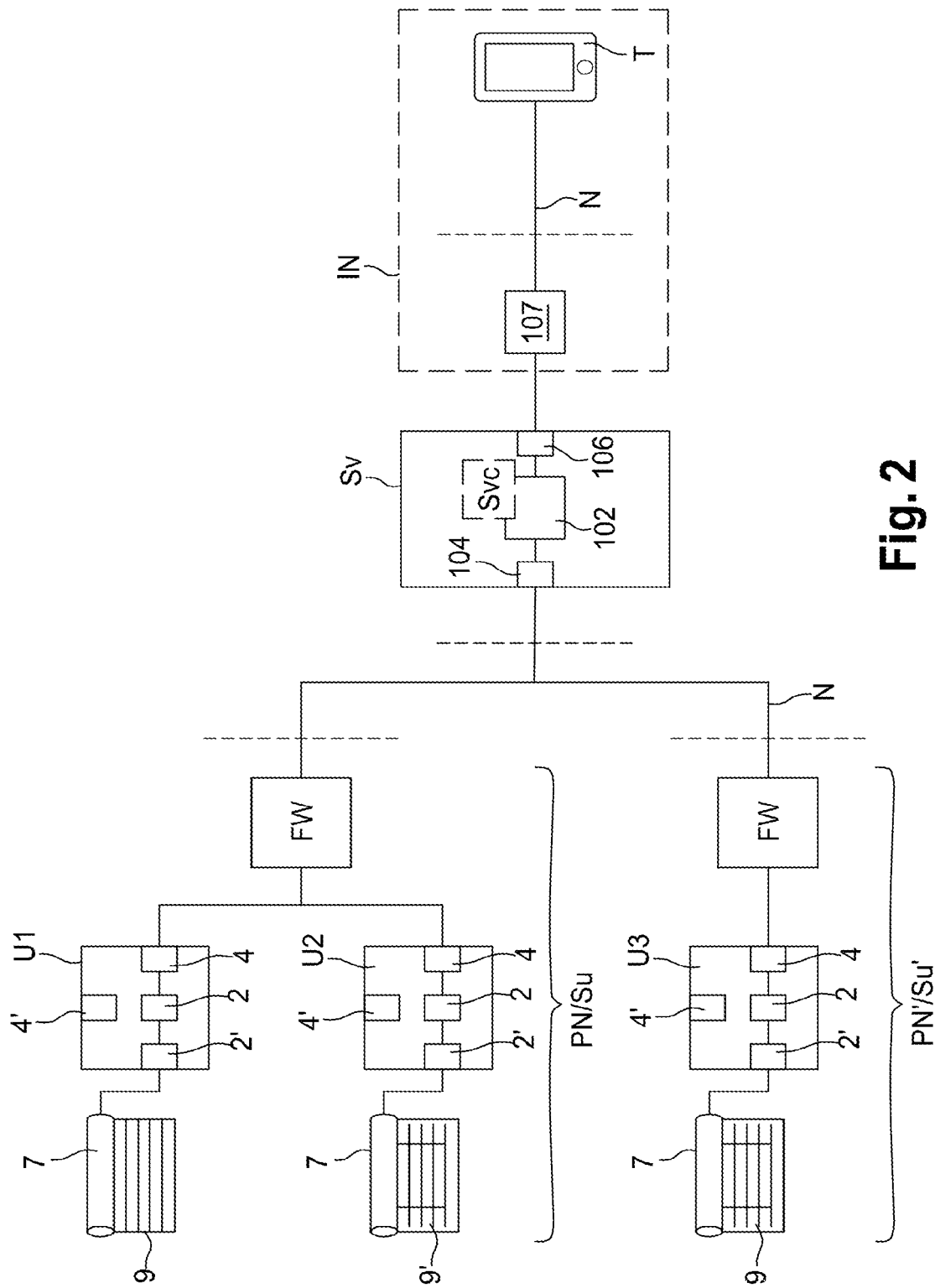
FIG. 2 is a diagram presenting an architecture of a system comprising the home automation installation illustrated in FIG. 1, a second home automation installation, as well as a plurality of servers intended to be connected to the home automation installations.

As represented in FIG. 2, each central control unit U is arranged to communicate with one or several remote server(s) Sv.

The central control units U1, U2, U3 are disposed on a private network PN, PN', whose access is generally protected by a firewall FW. In particular, in the example represented in FIG. 2, two central control units U1, U2 are disposed on a first private network corresponding to a first home automaton installation, while a third central control unit U3 is disposed on a second private network PN', independent of the private network PN corresponding to a second home automation installation Su'. The private network PN is linked to a wide area network N, for example the Internet. We will describe in the following one of these units.

A central control unit U comprises a processing unit 2 arranged to contain and execute a first computer program. As example, the processing unit 2 comprises a processor, a storage flash memory as well as a random access memory, and an Ethernet chip.

The processing unit executes an embedded software. This software undergoes updates to improve the functions thereof or to proceed with corrections.

The central control unit U further comprises at least one communication module 2' intended to monitor and/or control home automation equipment 3 and/or sensors 5, the home automation equipment 3 may consist of actuators 7, lightings 21, an alarm system, or a video camera.

As example, as represented in FIG. 2, the communication module 2' enables the monitoring and control of at least one actuator 7, a movable element of the building 1, such as for example a rolling shutter 9, or an orientable sunshade 9' or other actuators 7 or lightings 21, as previously described with reference to FIG. 1, according to at least one local communication protocol.

As example, the communication module 2' may be arranged to implement for example one or more of the local first protocols P1 such as for example Z-Wave, EnOcean, io-Homecontrol, Somfy RTS, KNX, MODBUS, Wavenis, Philips HUE. In general, these local first protocols are non-IP local communication protocols.

According to another possibility, for example in the context of alarm systems, the central control unit may be integrated into the home automation device. According to still another possibility, the central control unit may also be integrated to a router and/or a modem achieving a connection to a wide area network, in particular the Internet.

When the central control unit is integrated to a home automation device, the communication module 2' intended for the monitoring and/or control of the device may be a communication module internal to the home automation device and/or a communication module intended for the monitoring and/or control of other home automation devices.

There is also provided the reception of information from a sensor 5 providing information on the presence of a user or values of the surrounding parameters such as temperature, humidity and luminosity. In the same manner, the central unit U may enable the monitoring and/or control of an alarm system.

Each central control unit U may further comprise a communication module 4' for communicating according to a communication protocol other than the local first protocol. For example, the second communication protocol may be a communication protocol above the IP protocol on a local area network, or else a generic point-to-point protocol. As example, the application protocol WEAVE using transport protocols 6lowpan and thread for a mesh network may constitute a second protocol. Other examples include Bluetooth, Zigbee or Wifi.

The communication terminal T may contain and execute an application software APP.

Each central control unit U further comprises a module 4 for communication with remote servers Sv1$i$, Sv1$c$, Sv2.

The server Sv enables the remote control and/or monitoring and comprises one or several processing unit(s) 102 arranged to contain and execute a second computer program.

In some applications, a central control unit U may communicate with the server Sv through an intermediate server, for example a third-party service provider, whose intermediate server provides a service interface or API. In turn, the server Sv comprises at least one communication interface 104 intended for the communication with the central unit U.

The server Sv may also comprise a communication interface 106 intended for the communication with a control and/or monitoring interface IN enabling an end user Usr1 to remotely monitor the home automation installation, in particular via a configuration remote service Svc.

It should be noted that the term server is a logical designation which may cover the use of several physical servers to distribute the computer processing load to be carried out.

For example, the control and/or monitoring interface IN comprises a web server 107 and a mobile communication terminal T1 communicating via the wide area network N. For example, the mobile communication terminal T1 may consist of a smartphone or a tablet. The mobile communication terminal T1 may be the same or a terminal of the same type as that with which the central control unit U communicates locally by means of the communication module 4', or a different terminal. We will designate these mobile terminals indifferently by the reference T1. Alternatively, the end user may also use a stationary terminal.

The control and/or monitoring interface IN comprises a processor which may be disposed at the level of the web server 107 and/or the mobile communication terminal T1.

The processor of the control and/or monitoring interface IN is arranged to use a third computer program. In turn, this third computer program is arranged to execute a downloadable application.

The mobile communication terminal T comprises a data input device and a display device, for example in the form of a tactile control portion of a screen of the terminal T and in the form of one or several button(s) of the terminal T.

Unique Identifier of a Home Automation Device

The server Sv, the configuration service Svc as well as the central control units U may use a unique identifier to identify the home automation devices. The structure of a unique identifier of a home automation device DURL will now be described in connection with a particular embodiment.

According to this embodiment, the unique identifier of a home automation device comprises information on:

The local native protocol of the home automation device D;

The communication path to the device D, including the intermediate central control units U and the termination addresses to cross, whether organized or not in a hierarchical topology;

A subsystem identifier subsystemId if the device belongs to a group of devices D associated to the same address. The devices that are a unique expression of an address have no extension for identifying a subsystem.

Thus, the form of the unique identifier of a device DURL may be as follows:

<protocol>://<gatewayId>/<rawDeviceAddress>(#<subsystemId>)

Wherein the following fields are present:

protocol: identifier of the native device local protocol.

gatewayId: identifier of the first central control unit U, for example a serial number or a unique identifier.

rawDeviceAddress: a simple or multi-level path. Its meaning and its format depend on the addressing scheme of the local communication protocol of the device D.

subsystemId: this optional field indicates an identification, for example a rank of the subsystem (starting for example at 1), if such a subsystem is present.

EXAMPLES 1) knx://0201-0001-1234/1.1.3

This unique identifier DURL corresponds to a device D communicating by the KNX protocol with an individual address 1.1.3 accessible to the central control unit U carrying the identifier #0201-0001-1234.

2) io://0201-0001-1234/145036 #2

This unique identifier GDURL corresponds to a subsystem carrying the number 2 associated to a device D communicating by the io-Homecontrol protocol with a radio address 145036 accessible to the central control unit U carrying the identifier #0201-0001-1234.

Configuration Service

The configuration service Svc is intended to identify the correct technical configuration for the home automation device or the considered central control unit and to communicate configuration data and/or instructions to the central control unit U.

This service may be a remotely-accessible computerized service, which enables access to at last one control or supervision function of a home automation installation or of a home automation device, by means of a user interface or an application. The user interface may be accessible by a graphical interface, or through a programming interface.

Configuration Repository

The central control unit U implements a configuration repository Rf. The configuration repository Rf stores the correspondence between an identifier of a device DID and configuration data relating to this device Cfg. Moreover, this repository may contain a link Lk between a first home automation device D1 and a second home automation device D2 intended to replace the first one. An initialization specific value F1 may also be associated to a home automation device D2 to indicate that this home automation device has to be configured.

The Table 1 hereinbelow provides an example of a first data structure of the repository Rf.

TABLE 1

Example of a data structure of the repository Rf

| Identifier of a home automation device DID | Link Lk | Initialization FI | Configuration cfg |
|---|---|---|---|
| D1ID | — | N | Cfg1 |
| D2ID | D1ID | Y | Cfg2 |

As example, the repository may be constituted by a data base or a depository service. This repository may be comprised in the central control unit or in the first configuration service Svc1 or external and accessible by the first configuration service Svc1.

Configuration Method

Figure 3:
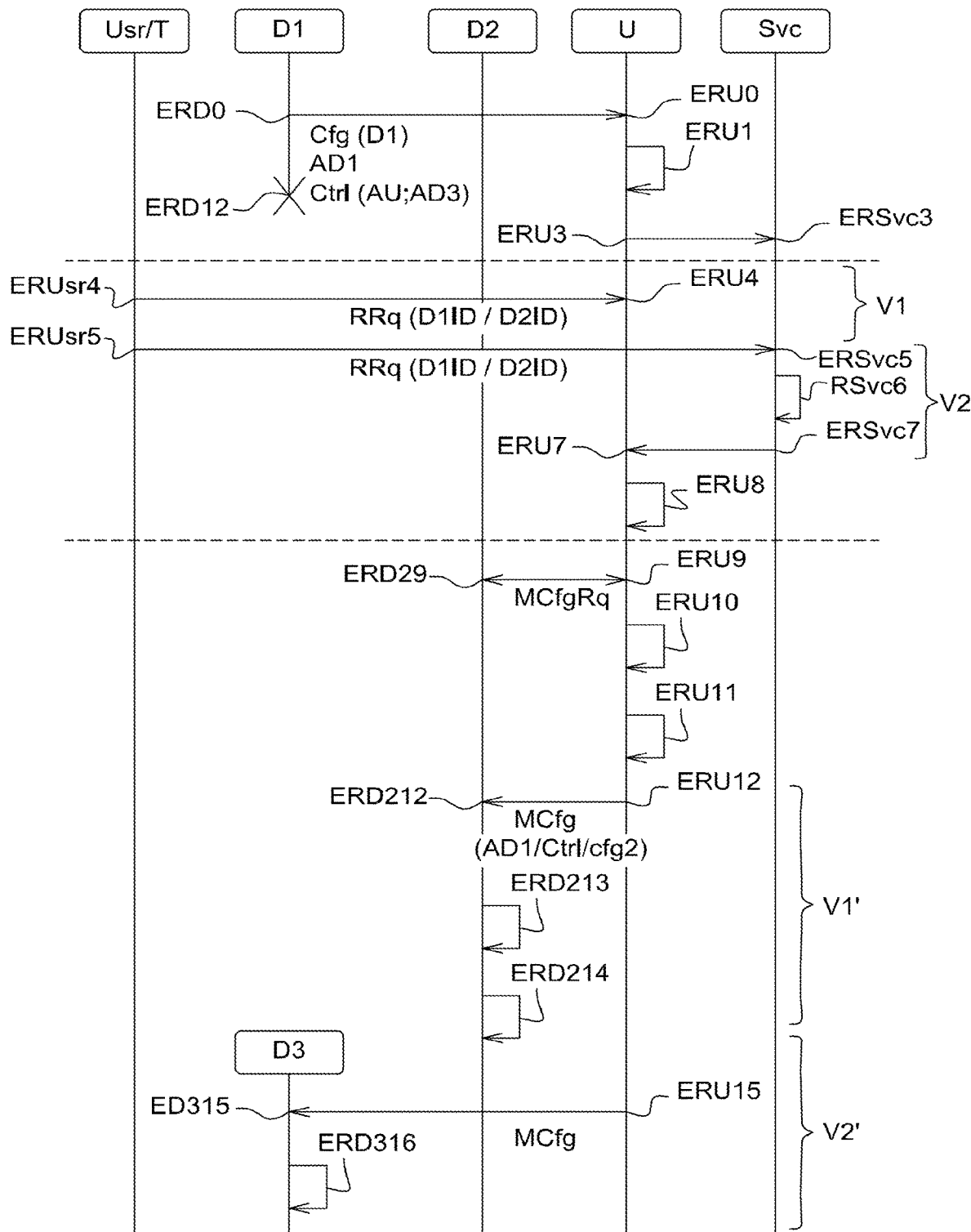
FIG. 3 is a diagram illustrating an implementation of a configuration method.
Figure 4:
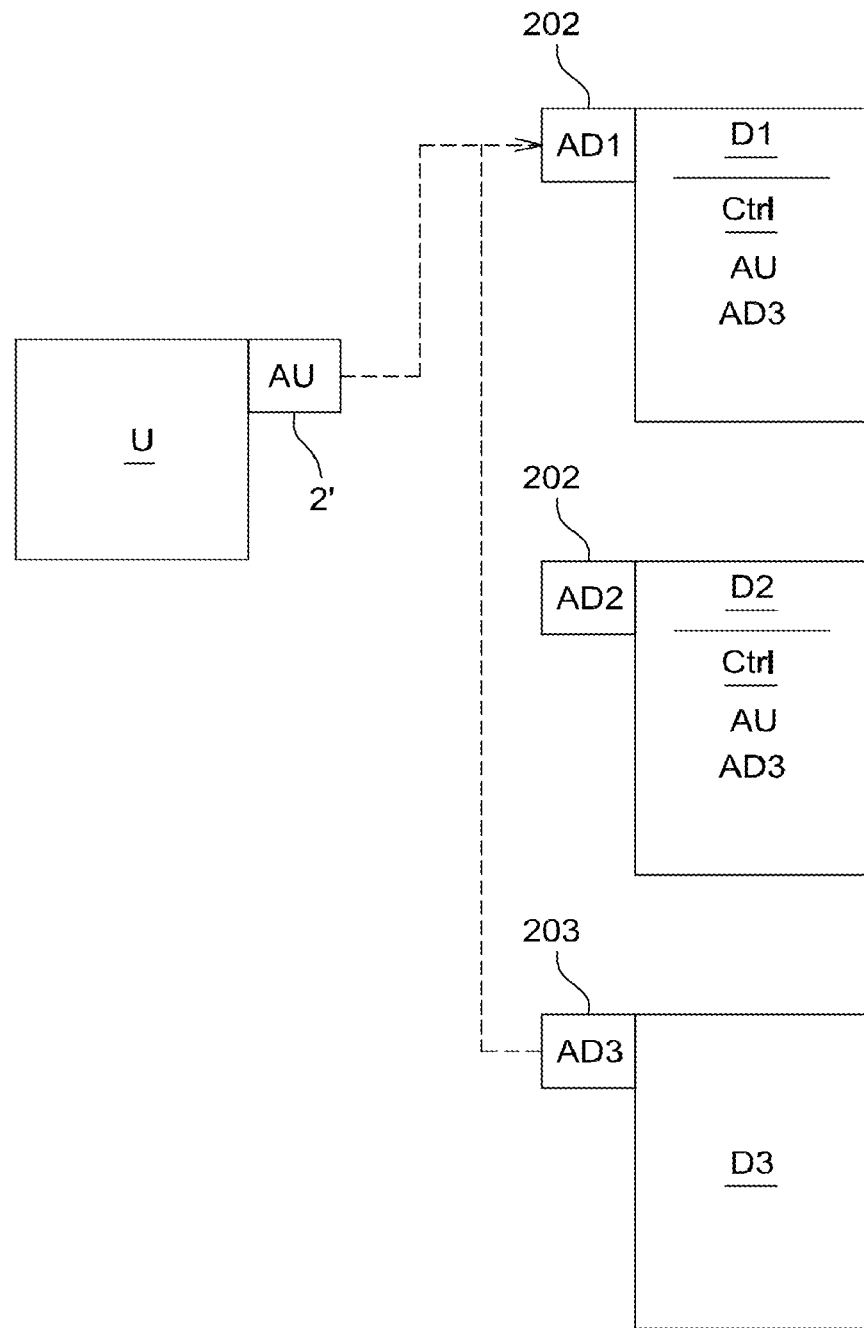
FIG. 4 illustrates details of configuration of the communication interfaces of home automation devices and of a central control unit.

We will now describe a configuration method in the context of the replacement of a home automation device D belonging to a home automation installation Su with reference to FIG. 3. FIG. 4 represents an example of a home automation installation in which a first home automation device D1 is paired in an initial state to a central control unit U. For example, the central control unit U has an interface 2' intended for the communication according to a first protocol P1. The central control unit U is identified by an address AU according to the first protocol. The first home automation device D1 has an interface 202 intended for the communication according to a first protocol P1. The first home automation device D1 is identified by an address AD1 according to the first protocol. The second home automation device D2 has an interface 202 intended for the communication according to a first protocol P1. The second home automation device D2 is identified by an address AD2 according to the first protocol. The third home automation device D3 has an interface 203 intended for the communication according to a first protocol P1. The third home automation device D3 is identified by an address AD3 according to the first protocol.

It is possible to consider three cases: a first case corresponding to a unidirectional communication from the home automation device D1 towards U; a second case corresponding to a unidirectional communication from U towards D1; and a third case of bidirectional communication between D1 and U.

It is also possible that a communication between D1 and another home automation device D3 intervenes, such that, for example, D3 could control D1. This case may correspond to a lamp-type home automation device D1, and a switch-type device D3. This configuration is shown in FIG. 4.

In the example, the device D1 comprises a table of controllers, identifying by their address in the communication protocol P1 the devices or units prone to communicate commands to D1. In the example, this table Ctrl comprises the address AU of the central control unit U and the address AD3 of the device D3.

According to one variant, the table of controllers may be stored in the home automation device D3.

The configuration of the first device is known to U, in particular as regards the content of the table of controllers of D1.

In a phase prior to the replacement method corresponding to a step ERD0 in FIG. 3, the home automation device communicates its configuration cfg in the form of at least one set of configuration data and/or instructions to the central control unit U which receives this at least one set at a step ERU0. At a step ERU1, the central control unit U stores said configuration in a configuration repository Rf, linked to a central control unit unique identifier.

These steps may be carried out at will during a backup operation carried out at the end of the configuration of the first home automation device D1, and/or periodically with updates of the stored data. It is also possible that these steps are possibly initiated before a replacement in the case of installation of a new version ("upgrade").

In particular, the at least one set of configuration data and/or instructions may comprise the address AD1 of the device D1 according to a communication protocol P1, and/or the table of controllers Ctrl of the device D1.

According to one possibility, the central control unit U may communicate all or part of this set, or a set of configuration data or instructions derived from this set at a step ERU3 to the configuration service Svc, which receives it at a step ERSvc3.

Alternatively to step ERD0, the configuration of the home automation device may be known to the central control unit U because this configuration is imposed by said central control unit, or input by a user, or else determined at least partially from data provided by the configuration service according to the type of the considered device.

As indicated in FIG. 3, we will suppose at step ERD12 that a failure or a disabling of the first home automation device D1 occurs. The disabling may correspond to an expected installation of a new model of home automation device D2.

Afterwards, the user Usr proceeds with a replacement of the home automation device D1 with a new home automation device D2.

According to a first possibility V1, at a step ERUsr4, the user emits, for example through a user terminal T or using an interface present on the central control unit U, a replacement request RRq to the central control unit U which receives it at a step ERU4. This request contains the identifier D1ID of the ancient device and the identifier D2ID of the replacement new home automation device D2.

According to a second possibility V2, at a step ERUsr5, the user emits, for example through a user terminal T, a replacement request RRq to the remote service Svc which receives it at a step ERSvc5. This request contains the identifier D1ID of the ancient home automation device and the identifier D2ID of the new home automation device D2.

The configuration service Svc may register the replacement request at a step ERSvc6, after having optionally checked up the existence and possibly requested an authentication element of the user such as a password. Afterwards, the service may prepare and send, at a step ERSvc7 a replacement request to the central control unit, on the basis of the elements communicated by the user, and possibly by providing complementary configuration data or instructions. In this case, the replacement request is received at a step ERU7.

In the case of the replacement with a new model of home automation device, the replacement request may intervene before the disabling.

As example, the identifier communicated by the user for the replacement home automation device D2 may be an address or an identifier enabling the discovery thereof according to the considered communication protocol P1.

At a step ERU8, the central control unit proceeds with a registration in the configuration repository Rf of the identifier of the replacement second home automation device D2, linked Lk to the first home automation device D1 to be replaced, in order to define the association between the first home automation device D1 or its identifier D1ID on the one hand and the second home automation device D2 or its identifier D2ID on the other hand. An initialization specific value FI may also be associated to the second home automation device D2 to indicate that this second home automation device D2 has to be configured.

At this level, at step ERU8, the central control unit U may determine all or part of at least one set of configuration data or instructions cfg2 associated to the identifier of the second home automation device D2 in order to store this set in the configuration repository Rf. The determination steps are detailed later on with reference to step ERU11.

Next, it is proceeded with a plugging and/or initialization of the second home automation device D2. This plugging/initialization may be trigged by an electric power supply or by an order originating from an instruction of the user through a physical action on the second home automation device D2 such as a press on a button or a sending of instruction via a terminal T.

In the context of this plugging or following this initialization, a pairing or a communication attempt intervenes between the second home automation device and the central control unit U, represented by step ERD29/ERU9.

The second home automation device D2 may also send a configuration request MCfgRq to the central control unit U.

This configuration request MCfgRq identifies the second home automation device D2 by an identifier D2ID. Of course, several successive steps may be carried out corresponding to the establishment of a communication, then to the configuration request. Alternatively, the configuration request may be on the initiative of a user who acts on the central control unit, directly using a user interface or through a mobile terminal, or through the configuration service Svc.

Following the identification of a configuration request, the central control unit proceeds with a check-up in the configuration repository Rf in order to determine whether the identifier D2ID is actually assigned, and which are the associated data. Following this check-up, one or several configuration step(s) are carried out by the central control unit represented together in FIG. 3 by step ERU10. In particular, these steps consist in suppressing or invalidating the record corresponding to the ancient home automation device D1.

These steps also comprise the steps consisting in updating the elements that referred to D1 to be replaced with a reference to D2. For example: updating a repository of the home automation devices D; in particular DURL; or updating a repository of the control scenarios.

The initialization specific value FI associated to the second control device may be updated to indicate that this control device is configured.

At a step ERU11, the central control unit U proceeds with the determination and/or the collection of the at least one set of configuration data or instructions cfg2 associated to the identifier of the second home automation device D2 in particular from the at least one set of configuration data or instructions cfg1 associated to the identifier of the first home automation device D1 and comprised in the configuration repository.

This determination step may comprise a partial or full copy of the at least one set of configuration data or instructions cfg1 associated to the identifier of the first home automation device D1.

This step may possibly comprise a step of converting the configuration cfg1 if the home automation device D2 is not of the same type as the home automation device D1, for example in the case of an upgrade or of the use of a different hardware system. It is also possible to proceed with adaptations of the configuration, for example when an address or a unique identifier should be replaced in the configuration cfg2.

All or part of the determination steps may be carried out beforehand during step ERU8, step ERU11 may be restricted to a collection of the set of configuration data or instructions cfg2 available in the configuration repository Rf.

According to a first possibility V1', the central control unit U may then send one or several configuration message(s) MCfg at a step ERU12 which are received by the second home automation device D2 at a step ERD212. The at least one configuration message Mcfg to D2 may contain a set comprising at least one configuration datum or instruction cfg2 derived from at least one configuration datum or instruction cfg1 relating to the home automation device D1.

In particular, this set of configuration data or instructions cfg2 may comprise an address corresponding to the address of the previous home automation device AD1, and possibly values corresponding to the table of controllers Ctrl of the home automation device D1.

At a step ERD213 and ERD214, the second home automation device D2 proceeds with its configuration on the basis of the information received from the central control unit U in the message MCfg.

In particular, this configuration may concern the modification of the emission and reception addresses of D2, to the extent that such an address could be modified depending on the used protocol P1.

Thus, step ERD213 may correspond to an assignment of the value of the address of the previous home automation device AD1 to the address AD2 of the second home automation device.

Step ERD214 may correspond to an assignment of the values of the table of controllers of the first home automation device D1, which comprised for example the addresses AU of the central control unit and AD3 of the third device in the table of controllers Ctrl of the second home automation device D2.

Thanks to these arrangements, the communication between the central unit U and the home automation device D2 on the one hand, and the home automation device D2 and the home automation device D3 on the other hand is enabled.

According to a second possibility V2' which may be cumulated with or alternative to the first one, it may be desired to modify the configuration of other devices of the installation communicating with D1. As example, this variant corresponds to a case in which the replacement home automation device D2 has an address in the protocol P1 that cannot be modified or in which it is preferable to keep this address.

Thus, at step ERU15, the central control unit U sends a configuration message Mcfg to D3 containing a set comprising at least one configuration datum or instruction cfg3. As example, the set may comprise an address corresponding to the address of the home automation device AD2 so as to modify in D3, in the table of controllers of D3, the address AD1 into an address AD2. The message is received by the device D3 at a step ED315.

At a step ERD316, the home automation device D3 proceeds with a modification in a table of controllers of the address AD1 into an address AD2. The entire table may possibly be modified.

According to a variant of the present invention, the method may be executed on the management unit instead of the central control unit, which acts in this case as a simple gateway. In this case, the configuration repository may be stored or accessible from the management unit.

The invention claimed is:

1. A method for configuring a second home automation device belonging to a home automation installation, in the context of a replacement of a first home automation device, the method being implemented by a central control unit of the home automation installation or by a remote management unit and comprising the following steps:
   reception of a replacement request in connection with an identifier of the first home automation device and an identifier of the second home automation device;
   registration of at least one set of configuration data or instructions associated to the identifier of the first home automation device;
   reception of a configuration request linked to the identifier of the second home automation device;
   determination of an association between the second home automation device or its identifier on one hand and the first home automation device or its identifier on an other hand;
   registration in a configuration repository of an association between the first home automation device or its identifier on one hand and the second home automation device or its identifier on an other hand;
   determination of at least one set of configuration data or instructions associated to the identifier of the second home automation device from the at least one set of configuration data or instructions associated to the identifier of the first home automation device; and
   sending at least one configuration message comprising the at least one set of configuration data or instructions associated to the identifier of the second home automation device to the second home automation device, wherein the at least one set of configuration data or instructions associated to the identifier of the second home automation device comprises at least one datum or instruction for configuring at least one emission and/or reception address of the second home automation device used for a communication interface with a third home automation device of the home automation installation or the central control unit.

2. The configuration method according to claim 1, wherein the at least one set of configuration data or instructions associated to the identifier of the second home automation device comprises at least one datum or instruction for configuring an emission and/or reception address used by a communication interface of the third home automation device related to the central control unit of the home automation installation, the method further comprising the following step:
   sending at least one configuration message comprising the at least one datum or instruction for configuring of an emission and/or reception address used by a communication interface of the third home automation device to the third home automation device.

3. The configuration method according to claim 1, wherein the step of determination of at least one set of configuration data or instructions associated to the identifier of the second home automation device from the at least one set of configuration data or instructions associated to the identifier of the first home automation device comprises an at least partial copy of the at least one set of configuration data or instructions associated to the identifier of the first home automation device.

4. The configuration method according to claim 1, wherein the step of determination of at least one set of configuration data or instructions associated to the identifier of the second home automation device from the at least one set of configuration data or instructions associated to the identifier of the first home automation device comprises a modification of a format of the at least one set of configuration data or instructions associated to the identifier of the first home automation device or a modification of a structure of the at least one of configuration data or instructions associated to the identifier of the first home automation device.

5. The configuration method according to claim 1, wherein the step of determination of at least one set of configuration data or instructions associated to the identifier of the second home automation device from the at least one set of configuration data or instructions associated to the identifier of the first home automation device comprises an adaptation of the at least one set of configuration data or instructions associated to the identifier of the first home automation device.

6. The configuration method according to claim 1, further comprising the following step:
registration of the at least one set of configuration data or instructions associated to the identifier of the second home automation device in the configuration repository.

7. The configuration method according to claim 1, further comprising the following step:

update of the configuration repository so as to register the effective replacement of the first home automation device with the second home automation device.

8. The configuration method according to claim 1, further comprising the following steps:
check-up of an availability of the identifier of the second home automation device before the configuration repository;
the check-up step being prior to the reception of the replacement request.

9. The configuration method according to claim 1, wherein the at least one set of configuration data or instructions associated to the identifier of the second home automation device comprises at least one datum or instruction for configuring an emission and/or reception address used by a communication interface of the third home automation device related to the central control unit of the home automation installation, the method further comprising the following step:
sending at least one configuration message comprising the at least one configuration datum or instruction of an emission and/or reception address used by the communication interface of the third home automation device to the third home automation device.

\* \* \* \* \*